United States Patent
Nie et al.

(10) Patent No.: US 10,613,904 B2
(45) Date of Patent: *Apr. 7, 2020

(54) NON-DIRECTIONAL TRANSMISSIBLE TASK

(71) Applicant: International Business Machines Corporation, Armonk, NY (US)

(72) Inventors: Lei Nie, Xian (CN); Chun Lei Xu, Xian (CN)

(73) Assignee: International Business Machines Corporation, Armonk, NY (US)

( * ) Notice: Subject to any disclaimer, the term of this patent is extended or adjusted under 35 U.S.C. 154(b) by 189 days.

This patent is subject to a terminal disclaimer.

(21) Appl. No.: 15/591,524

(22) Filed: May 10, 2017

(65) Prior Publication Data
US 2018/0329754 A1 Nov. 15, 2018

(51) Int. Cl.
*G06F 9/46* (2006.01)
*G06F 9/50* (2006.01)

(52) U.S. Cl.
CPC .... *G06F 9/5044* (2013.01); *G06F 2209/5011* (2013.01)

(58) Field of Classification Search
CPC .... G06F 9/5044; G06F 9/5027; G06F 9/5005; G06F 2209/5011; H04L 67/1008; H04L 67/10; H04L 67/1014; H04L 67/1017; H04L 67/1019; H04L 67/1023
See application file for complete search history.

(56) References Cited

U.S. PATENT DOCUMENTS

| | | | |
|---|---|---|---|
| 6,557,025 B1 * | 4/2003 | Hattori | H04L 29/06 709/200 |
| 7,406,697 B2 | 7/2008 | Laux | |
| 7,920,532 B2 * | 4/2011 | Zhang | H04L 45/12 370/310.2 |
| 8,418,127 B2 | 4/2013 | Kohno | |
| 9,262,183 B2 | 2/2016 | Liensberger et al. | |
| 9,699,017 B1 * | 7/2017 | Gupta | H04L 67/1095 |

(Continued)

FOREIGN PATENT DOCUMENTS

| | | |
|---|---|---|
| EP | 2390740 A2 | 11/2011 |
| EP | 2584772 A1 | 4/2013 |

OTHER PUBLICATIONS

List of IBM Patents or Patent Application Treated As Related, Nov. 2018, 1 page.

(Continued)

*Primary Examiner* — Emerson C Puente
*Assistant Examiner* — Zhi Chen
(74) *Attorney, Agent, or Firm* — Robert Bunker; SVL IPLaw

(57) ABSTRACT

According to an embodiment of the present disclosure, a non-directional task comprising a user's requirement is generated. The non-directional task is sent to a first resource node in a task network. The task network comprises a plurality of resource nodes that provide services accessible to the user. The non-directional task does not specify which resource node to perform the non-directional task. It is determined whether the first resource node can perform at least part of the non-directional task. The non-directional task is forwarded from the first resource node to a second resource node of the task network.

18 Claims, 13 Drawing Sheets

(56) References Cited

U.S. PATENT DOCUMENTS

| | | | |
|---|---|---|---|
| 2001/0004737 A1 | 6/2001 | Laux | |
| 2003/0167329 A1* | 9/2003 | Kurakake | G06F 9/5044 709/226 |
| 2006/0143350 A1* | 6/2006 | Miloushev | G06F 9/5016 710/242 |
| 2007/0250604 A1* | 10/2007 | Wu | H04L 12/00 709/220 |
| 2008/0212583 A1* | 9/2008 | Rey | H04L 12/1836 370/390 |
| 2009/0043761 A1 | 2/2009 | Kohno | |
| 2010/0146516 A1 | 6/2010 | Yao | |
| 2011/0106886 A1* | 5/2011 | Nolterieke | G06F 8/65 709/204 |
| 2012/0155265 A1* | 6/2012 | Ballani | H04L 47/826 370/235 |
| 2013/0282748 A1 | 10/2013 | Liensberger et al. | |
| 2013/0304641 A1 | 11/2013 | Dabbiere | |
| 2013/0311621 A1* | 11/2013 | Tyson | H04W 4/21 709/219 |
| 2014/0195514 A1 | 7/2014 | Stein | |
| 2015/0006341 A1* | 1/2015 | Egenolf | G06Q 20/14 705/34 |
| 2015/0149615 A1* | 5/2015 | Broussard | G06F 9/5083 709/224 |
| 2015/0350006 A1 | 12/2015 | Bhargava et al. | |
| 2017/0111445 A1* | 4/2017 | Kunde | H04L 67/1014 |
| 2018/0088983 A1* | 3/2018 | Demchenko | G06F 9/4843 |
| 2018/0349178 A1* | 12/2018 | Painter | G06F 9/485 |
| 2019/0065273 A1 | 2/2019 | Nie et al. | |

OTHER PUBLICATIONS

"Detection of Authorization Across Systems", U.S. Appl. No. 15/215,755, filed Jul. 21, 2016, 30 pages.

* cited by examiner

USE CASE: CONVENTIONAL APPROACH

USE CASE: NEW APPROACH

NON-DIRECTIONAL TRANSMISSIBLE TASK

BACKGROUND

Present invention embodiments relate to data processing and communication, and particularly, to task generation and performance in a network environment.

With the development of the Internet, more and more computing services are provided via networks, such as the Internet or an intranet. Conventionally, users log on with a special interface, named user interface (UI), built on a Web page or application to access a service/resource, by calling/invoking the service. For example, a user can store photos with a cloud storage service; a user can analyze data with a data analysis service; a user can get a weather forecast with a weather information service; and so on.

Most of these services are provided via application programming interfaces (APIs). These APIs can be a certain program API, a web service or a RESTful API. Normally, the interaction between the UI and the back-end computing service is based on APIs or instructions. For example, a user may click a "search" button, with a keyword "computer". The UI will collect the user input/action and invoke the computing service which provides the searching service. In this case, an API may be called, such as service.search ("computer"). In a like manner, interactions between a computing system with other computing systems are also based on API calls. As the number of computing systems grows, the interactions among them based on API calls may become more and more complex.

SUMMARY

According to an embodiment of the present invention, there is provided a computer-implemented method. In the method, a non-directional task comprising a user's requirement is generated. The non-directional task is sent to a first resource node in a task network. The task network comprises a plurality of resource nodes that provide services accessible to the user. The non-directional task does not specify which resource node to perform the non-directional task. It is determined whether the first resource node can perform at least part of the non-directional task. The non-directional task is forwarded from the first resource node to a second resource node of the task network.

According to another embodiment of the present invention, there is provided a computer-implemented method. In the method, a non-directional task comprising a user's requirement is generated. The non-directional task is sent to a resource node in a task network. The task network comprises a plurality of resource nodes that provide services accessible to the user. The non-directional task does not specify which resource node to perform the non-directional task.

According to another embodiment of the present invention, there is provided a computer-implemented method. In the method, a non-directional task comprising a user's requirement is received by a first resource node in a task network. The task network comprises a plurality of resource nodes that provide services accessible to the user. The non-directional task does not specify which resource node to perform the non-directional task. It is determined whether the first resource node can perform at least part of the non-directional task. The non-directional task is forwarded to a second resource node of the task network.

According to another embodiment of the present invention, there is provided a system comprising one or more processors, a memory coupled to at least one of the processors, and a set of computer program instructions stored in the memory and executed by at least one of the processors in order to perform an action of generating a non-directional task comprising a user's requirement. The set of computer program instructions are executed by at least one of the processors in order to further perform an action of sending the non-directional task to a resource node in a task network. The task network comprises a plurality of resource nodes that provide services accessible to the user. The non-directional task does not specify which resource node to perform the non-directional ask.

According to another embodiment of the present invention, there is provided a system comprising one or more processors, a memory coupled to at least one of the processors, and a set of computer program instructions stored in the memory and executed by at least one of the processors in order to perform an action of receiving, at a first resource node in a task network, a non-directional task comprising a user's requirement. The task network comprises a plurality of resource nodes that provide services accessible to the user. The non-directional task does not specify which resource node to perform the non-directional task. The set of computer program instructions are executed by at least one of the processors in order to further perform an action of determining whether the first resource node can perform at least part of the non-directional task. The set of computer program instructions are executed by at least one of the processors in order to further perform an action of forwarding the non-directional task to a second resource node of the task network.

According to another embodiment of the present invention, there is provided a computer program product comprising a computer readable storage medium having program instructions embodied therewith. The program instructions are executable by a processor to cause the processor to generate a non-directional task comprising a user's requirement. The processor is further caused to send the non-directional task to a resource node in a task network. The task network comprises a plurality of resource nodes that provide services accessible to the user. The non-directional task does not specify which resource node to perform the non-directional task.

According to another embodiment of the present invention, there is provided a computer program product comprising a computer readable storage medium having program instructions embodied therewith. The program instructions are executable by a processor to cause the processor to receive, at a first resource node in a task network, a non-directional task comprising a user's requirement. The task network comprises a plurality of resource nodes that provide services accessible to the user. The non-directional task does not specify which resource node to perform the non-directional task. The processor is further caused to determine whether the first resource node can perform at least part of the non-directional task. The processor is further caused to forward the non-directional task to a second resource node of the task network.

BRIEF DESCRIPTION OF THE SEVERAL VIEWS OF THE DRAWINGS

Through the more detailed description of some embodiments of the present disclosure in the accompanying drawings, the above and other features and advantages of the present disclosure will become more apparent, wherein the same reference generally refers to the same components in the embodiments of the present disclosure.

DETAILED DESCRIPTION

Figure 1:
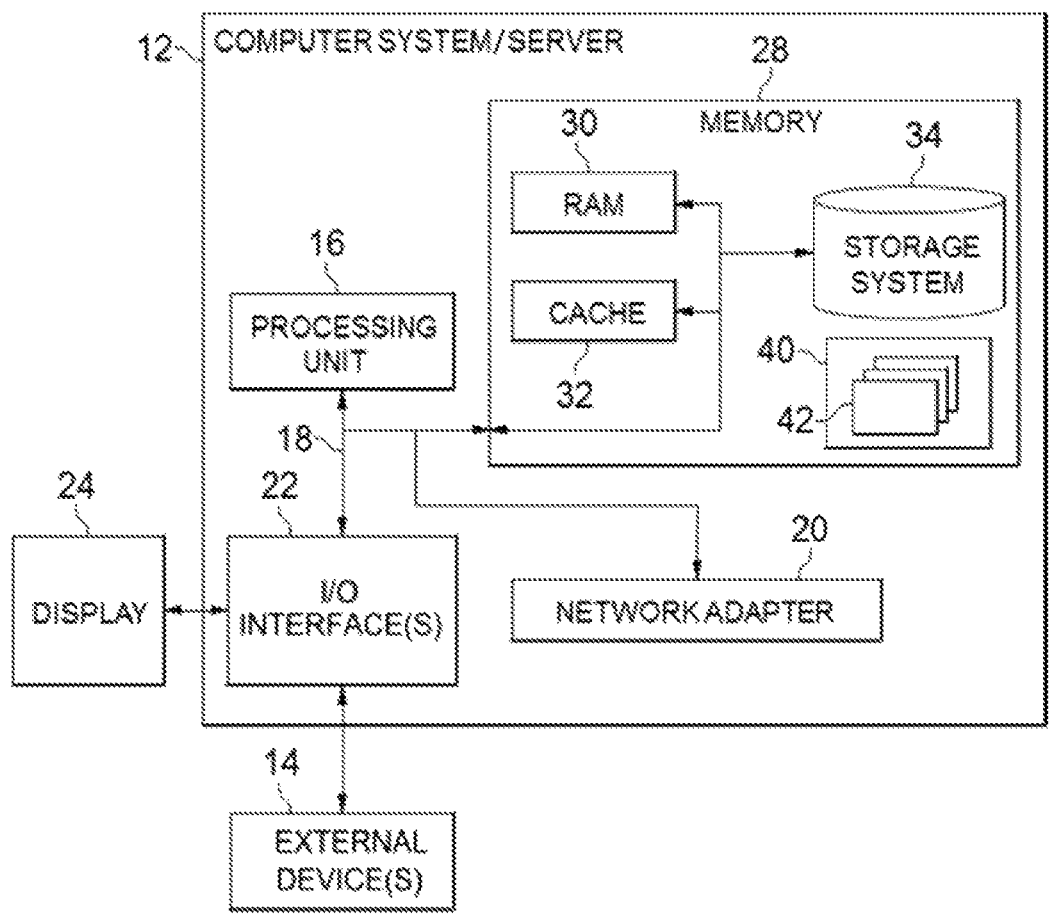
FIG. 1 shows an example computer system which is applicable to implement some embodiments of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Conventionally, the interactions between the UIs and back-end computing services are based on APIs or instructions. The interactions between a computing system with other computing systems are also done through API calls. In the conventional API callings, the service/resource (destination) must be specified for a task requirement. In other words, the caller must know the requirement type or the required API method/function. For example, for the API calling "weatherHost.predict(tomorrow)", both the destination ("weatherHost") and the API function ("predict") must be specified by the caller.

With the growth of the Internet and intranets, a user device or a computer system may use or interact with a large number of services/resources. It becomes harder for a user device or a computer system to know or remember the APIs for all services or resources it interacts with. Meanwhile, the conventional approaches are not intelligent and not easily-flexible, because calling APIs and the specified interaction methods are always full of technical meaning and fixed technical parameters.

There have been some approaches to these issues. An example is voice-assistant applications. Users can use some voice-assistant applications to obtain desired information, but the capability is still limited. The voice-assistant applications only "translate" the listened audio to some pre-defined API callings with fixed destinations.

Embodiments of the present disclosure are advantageous with respect to at least some of the above issues. Some embodiments provide a next generation way for computing interaction. That is, the "computing" will be based on "understanding" by self, instead of "asking/requesting/ordering" from others. The implementation details of the embodiments will be described with reference to FIGS. 1-17.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which can also be adapted to depict an illustrative example of a portable electronic device such as a communication device being applicable to implement the embodiments of the present invention, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
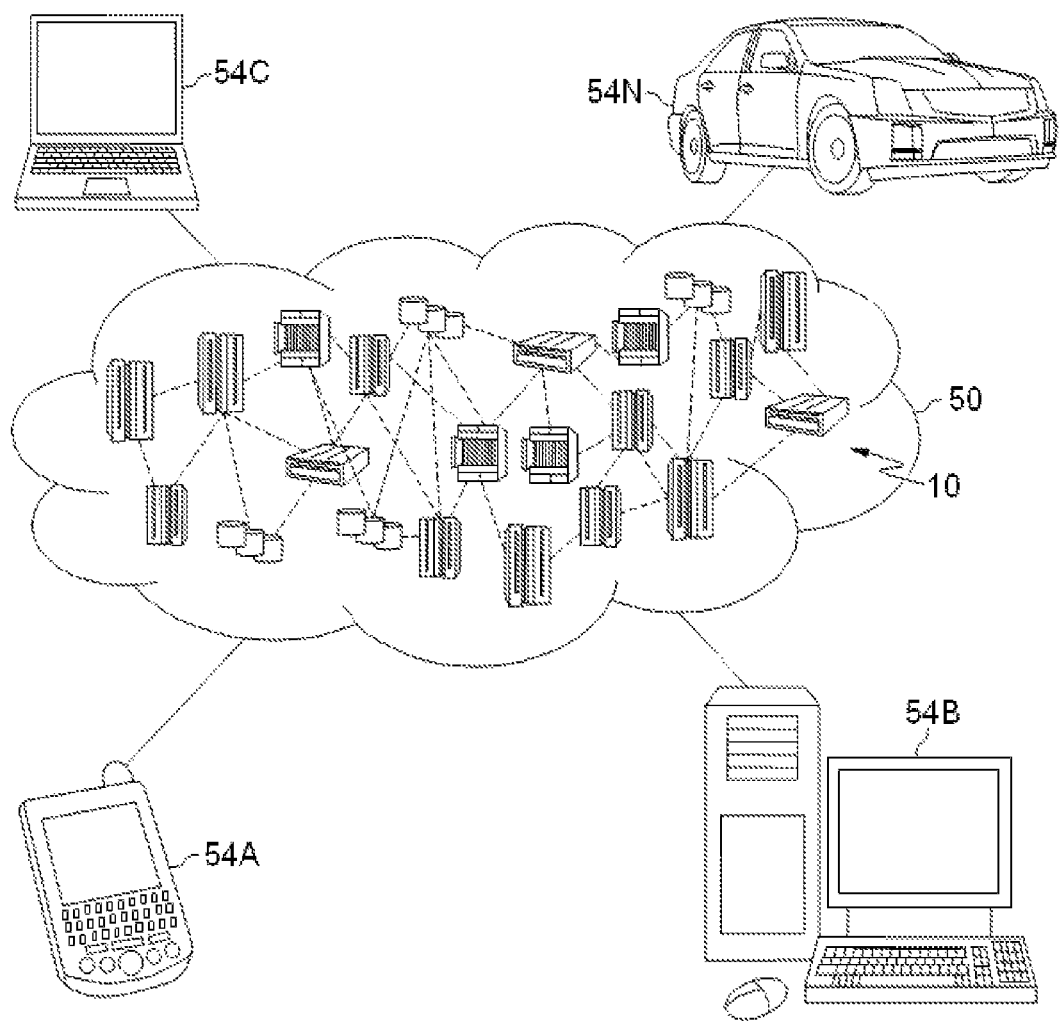
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
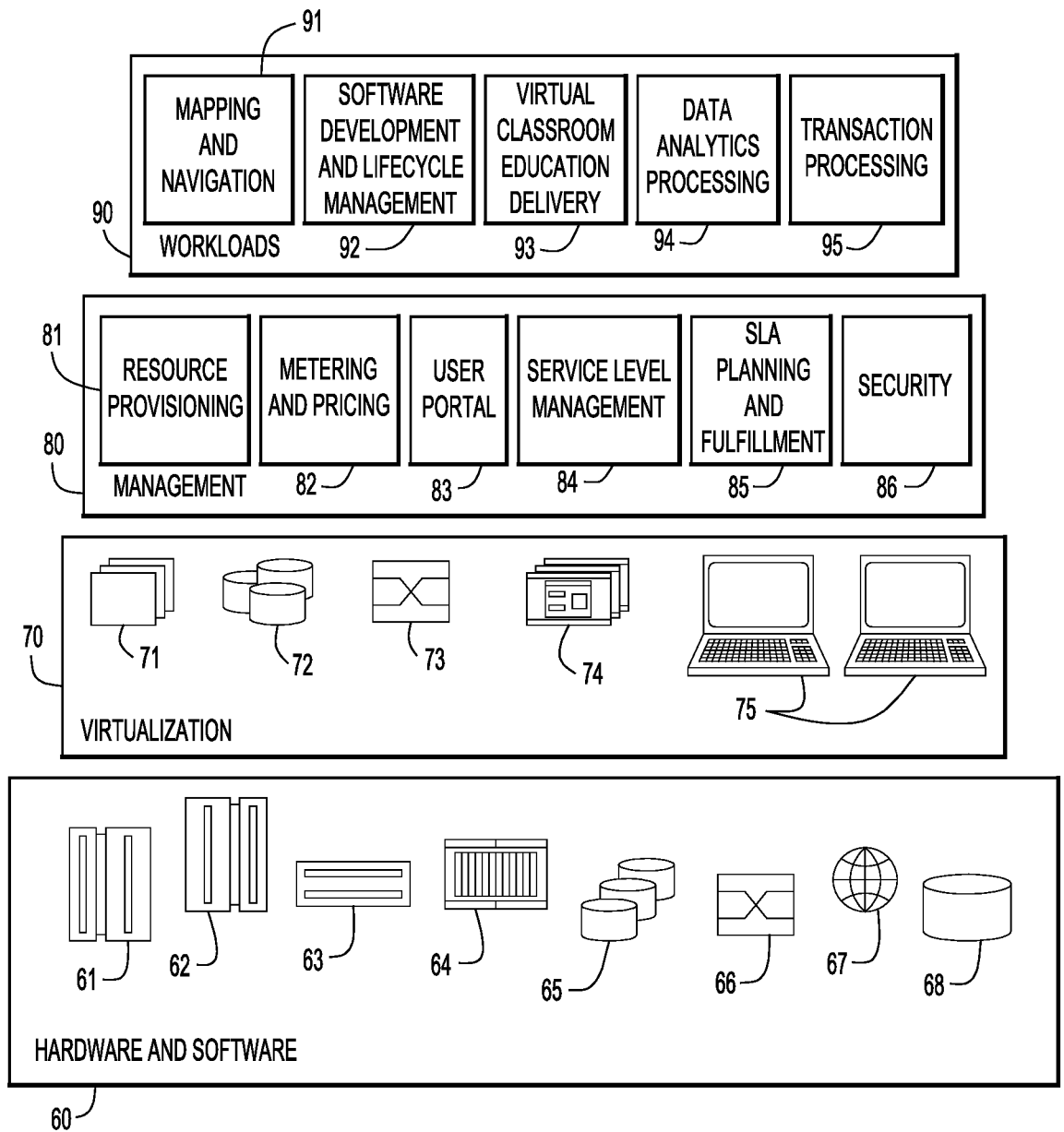
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security 86 provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and so on.

Figure 4:
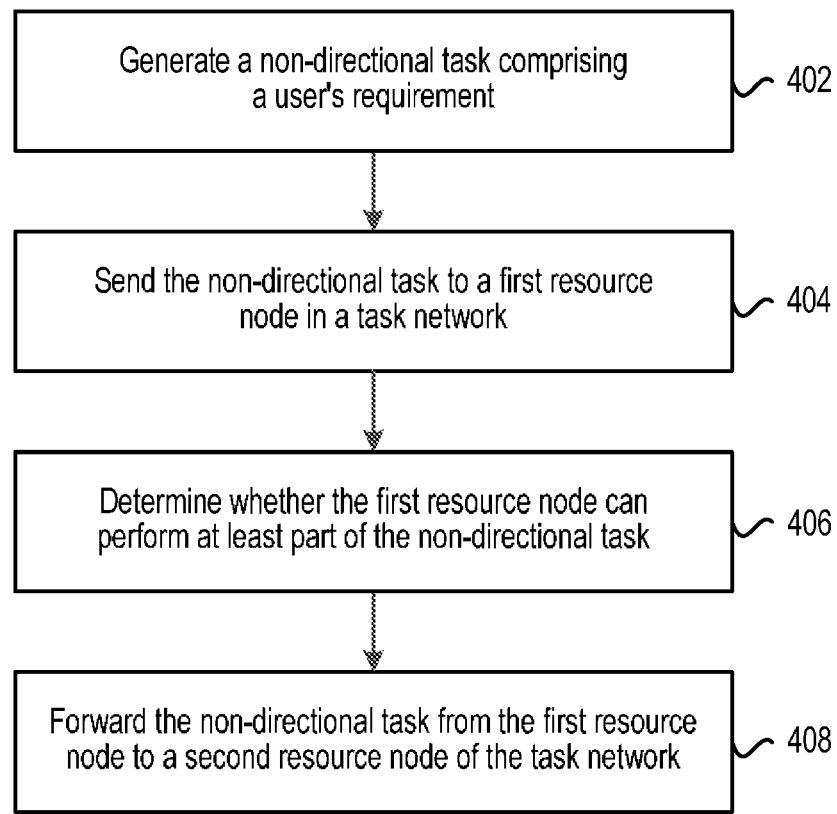
FIG. 4 is a flow chart showing a computer-implemented method for a non-directional task according to an embodiment of the present disclosure.

FIG. 4 is a flow chart showing a computer-implemented method for a non-directional task according to an embodiment of the present disclosure. The term "non-directional task" (also referred to as "non-directional and transmissible task" or simply as "task" herein) is an information package that includes some necessary content, to describe/present the requirement from a user. Unlike a conventional API call, the non-directional task does not specify the resource or system that is responsible to carry out or perform the task. The requirement can be for any purpose or goal that a user desires to achieve. As an example, the requirement can be an operation of certain resources, such as saving a file, searching some pre-stored photos, turning on a TV, starting a water heater, and the like.

At step 402, a non-directional task comprising a user's requirement is generated. This step may be performed by a user device. The user device may be any device which can be operated by the user. Examples of the user device may include, but not limited to, a personal computer (PC), mobile phone, personal digital assistant (PDA), tablet computer, portable computer, intelligent TV, and so on.

Figure 5:
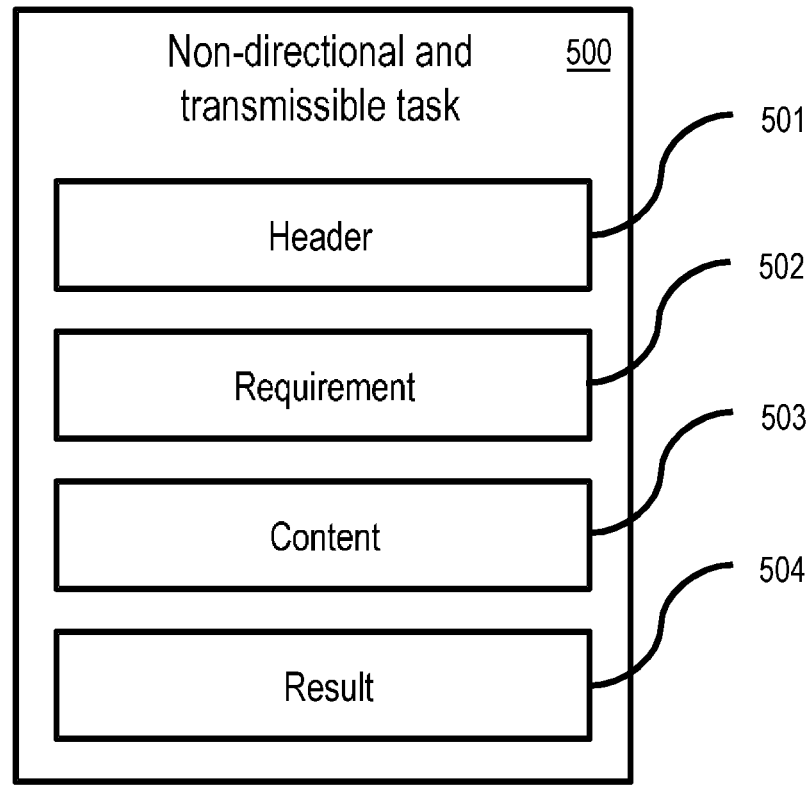
FIG. 5 shows the structure of a non-directional task according to an embodiment of the present disclosure.

FIG. 5 shows the structure of a non-directional task according to an embodiment of the present disclosure. As shown in FIG. 5, the non-directional and transmissible task 500 may comprise a header component 501, a requirement component 502, a content component 503 and a result component 504. The non-directional task does not specify which system/resource to perform the task.

The header component 501 is used to provide some basic information of the task 500. For example, it may comprise a task identification (ID) and information about the user, source, time, type, or the like. The task ID is used to identify a non-directional task. As an example, the task ID may be a global ID in the task network. The task network can be used to perform the task. It will be described in detail later.

The user information can be related to the user who creates and sends out the task. The source information can be related to the first system that receives the task. The time information can be related to the time when the task is created by the user device or is received by the first system. The type information can be related to the type of the task, for example, "executable task" or "execution result".

The requirement component 502 is used to provide information about the requirement of the user in the task. The requirement component 502 will be described in detail with reference to FIG. 6. The content component 503 can provide the information about the content which needs to be processed by the task. For example, the content component 503 may be text file, binary file such as image, video and audio, or some other structured/unstructured content. Further, the content component 503 may also be in the form of reference/link/address/URL/URI or others, which can point to the content.

The result component 504 is used to provide information about the task execution result. For example, it may comprise information about the executor, time of execution, state, content of the result, or the like.

The executor information can be related to the system/resource which has executed the task. The time information can be related to the begin/end time of the execution. The state information can be related to success/failure of the execution. The content information can be related to content of the result generated by the task execution. It may be the content itself, or reference/link/address/URL/URI or the like which can point to the content.

Figure 6:
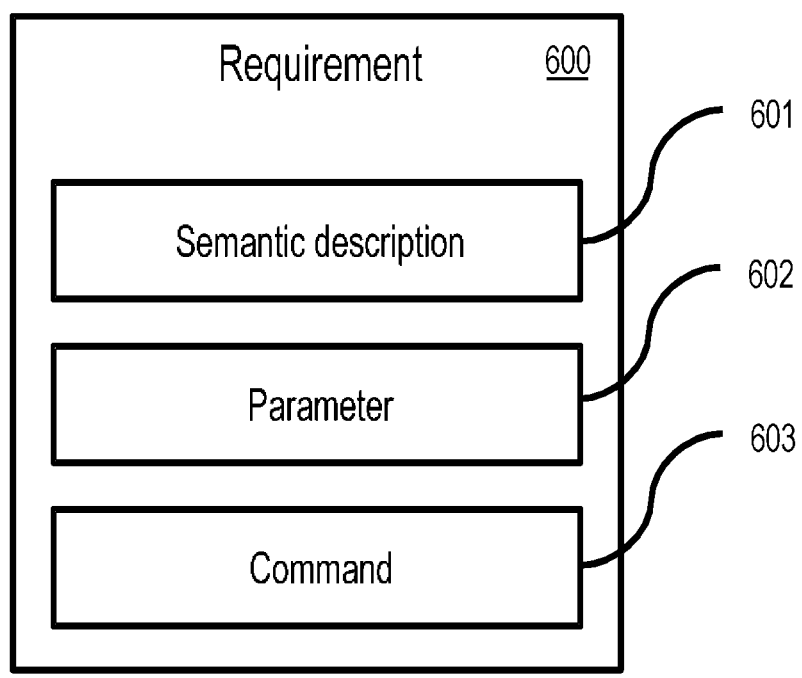
FIG. 6 shows the structure of a task requirement according to an embodiment of the present disclosure.

FIG. 6 shows the structure of a task requirement according to an embodiment of the present disclosure. As shown in FIG. 6, the requirement component 600 may comprise a semantic description component 601, a parameter component 602 and a command component 603. The components 601, 602 and 603 can be used separately or in combination. That is, any one of them or a combination of them can be used to describe the requirement of the task.

The semantic description component 601 describes the requirement of the user by an understandable sememe. For example, it may comprise a text, a sentence/phrase of a natural language, an audio file based on speech, a video file based on a gesture or action, or the like.

The parameter component 602 may comprise one or a set of parameters. A parameter may be a key-value pair, which describes an individual requirement, or a property of the requirement. For example, the key may include, but not limited to, file type, file size, device type, operation name, or the like. The key-value pair may be presented by readable text or binary data, such as "Filesize: 20 MB", "Location: Beijing" and "Type: MPEG". In this way, the set of parameters can describe a complete requirement by some pre-defined keys and corresponding values, or by a parameterized value list.

The command component 603 may comprise one or a series of instructions or a combination of pre-defined keywords, syntax and parameters. The command component 603 can be accepted and executed on a proper system/resource. The purpose or goal of the requirement can be achieved when the instruction(s) in the command component 603 is executed. Thus, the command component 603 can describe the requirement in a direct way.

Returning to FIG. 4, at step 404, the non-directional task is sent to a first resource node in a task network. The task network comprises a plurality of resource nodes that provide services accessible to the user. Unlike the conventional API callings, the non-directional task does not specify which system or resource node to perform the task.

The term "resource node" (also be referred to as "resource", "service", "system" or "node" herein) may refer to any computing devices, computer systems, resources, software (or programs), which are interactive to others and can provide computing ability, or data storage ability, or any other service, to a user. All resource nodes (resources/services) that a user has access to constitute a task network for that user. Examples of the resource/service may include, but not limited to, cloud systems, enterprise resource planning (ERP) systems, mail systems, office systems, cluster-computing systems, big data systems, artificial intelligence systems, smart home appliances and so on.

Figure 7:
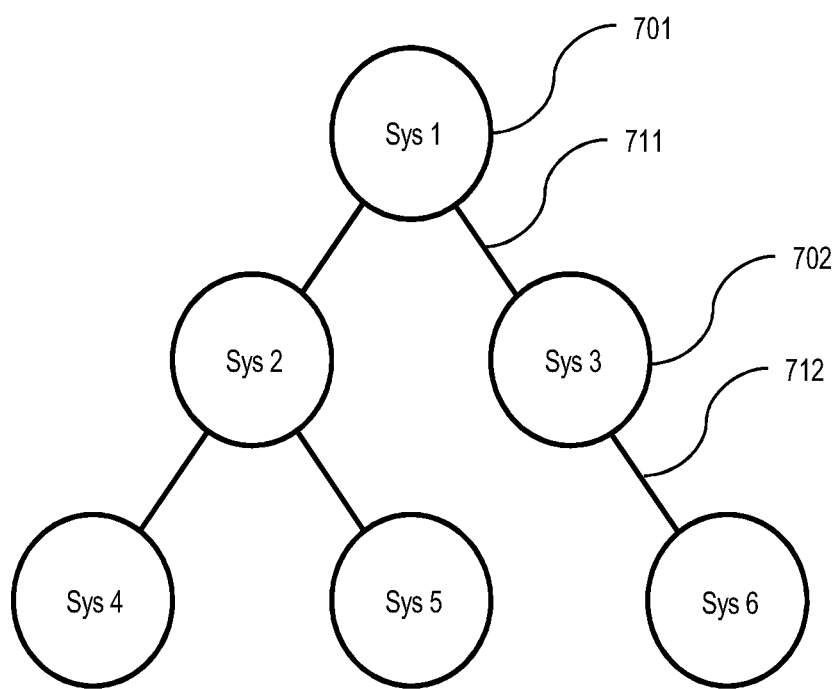
FIG. 7 shows the structure of an example task network.

FIG. 7 shows an example task network. As shown in FIG. 7, the task network comprises six systems, Sys 1 to Sys 6. They are accessible to a user. Sys 1-6 are connected with each other by any existing or future communication technologies, such as HTTP, FTP, Socket, TCP/IP, Ethernet, wired or wireless network, Bluetooth and so on.

In an embodiment of the disclosure, a user may manually configure the task network by creating connections between the systems, Sys 1-6. For example, the user may log on the system Sys 1 (701) and create a connection to the system Sys 2 (702). Sys 1 will remember and store the connection information/configuration, such that Sys 1 can send a non-directional task to Sys 2 in the future. In like manner, Sys 2 can also have the same connectivity to Sys 1, such that Sys 2 can also send a non-directional task to Sys 1. This step of creating connection may be repeated to create the task network. In FIG. 7, the user needs to create connections 711, 712 and others.

Figure 8A:
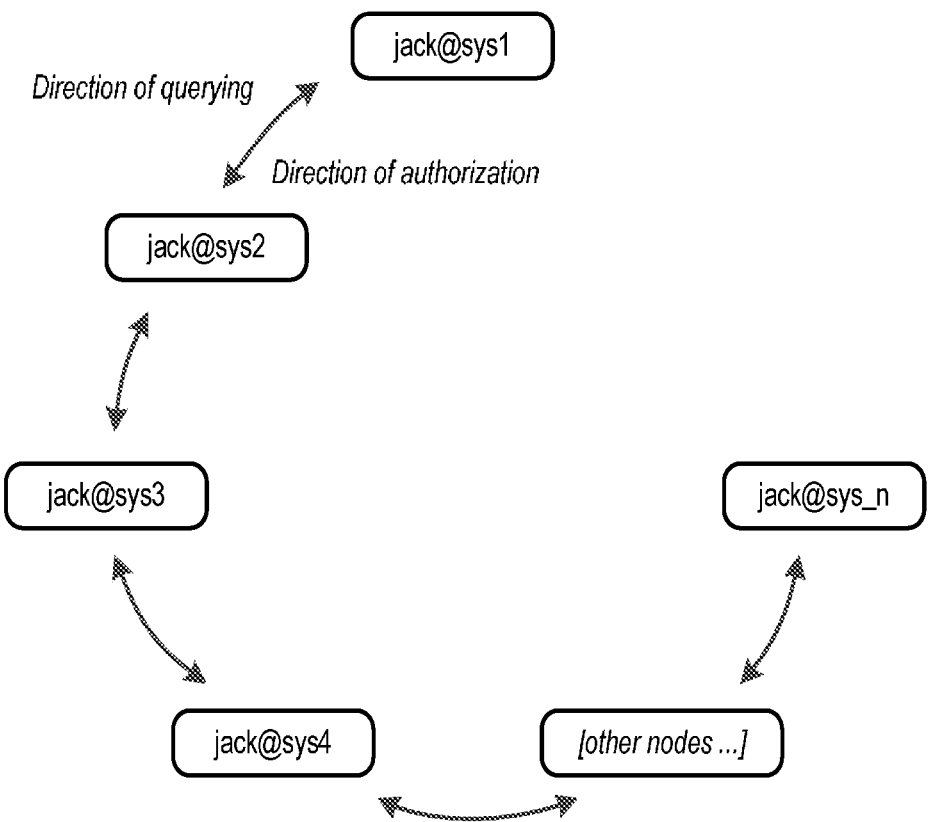
FIGS. 8A and 8B show an example for the formation of an authorization chain.

In another embodiment of the disclosure, existing information may be utilized to form a task network. For example, if an authorization chain already exists, it can form an authorization network. This authorization network may be utilized to form a task network naturally. The authorization chain means that in case where a user has different accounts on different systems, a first system has configuration information associating its own account with the user's account on a second system. In this way, the second system can use its own account to log on the first system and have the same privilege as the user's account on the first system. In this case, the user does not need to configure the connections manually. All connections of the chain network may be reused. As shown in FIG. 8A, the authorization chain comprising sys 1, sys 2, sys 3, sys 4 and other systems may be used to form a task network without any other connection creating operations.

Figure 8B:
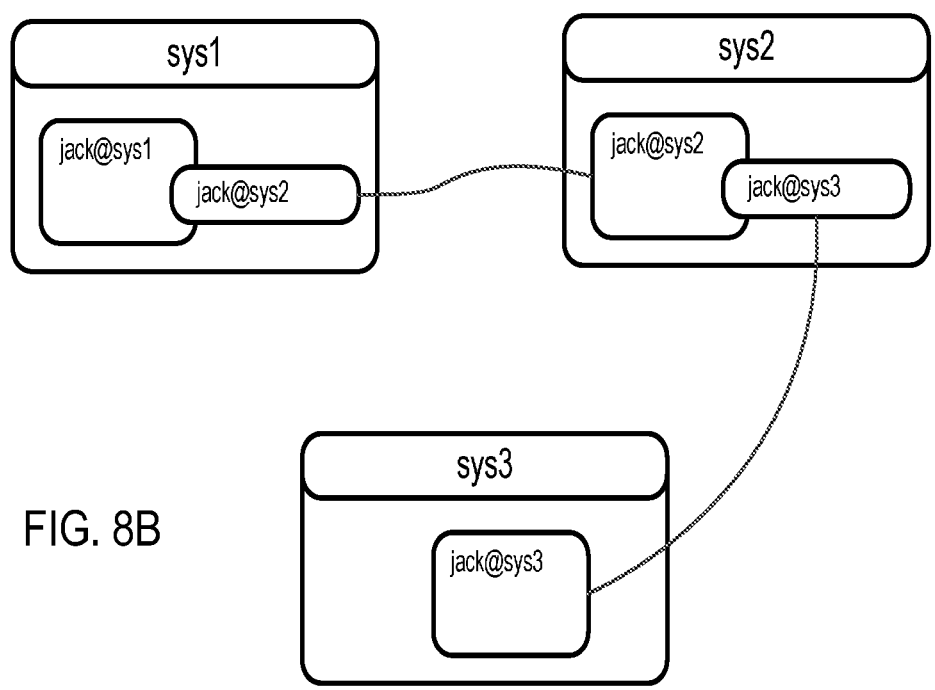

FIG. 8B shows further details for the formation of an authorization chain. As shown in FIG. 8B, a user has account "user1@sys1" on "sys1" and "user2@sys2" on "sys2". The user can associate "user2@sys2" with "user1@sys1" on "sys1". This means that the user enables the user account "user2" for "sys2" to have the same authorities as "user1" for "sys1". After "sys2" authenticates "user2", it can initiate a connection to "sys1" for resources/services that are only accessible to "user1". To this end, it indicates to "sys1" that the associated user account for "sys1" is "user1". "Sys1" checks if "user2@sys2" is an associated account of "user1". If yes, "sys1" will let "user2@sys2" access any resources/services that are accessible to "user1". If not, "sys1" will deny the connection.

Based on the method described above, when a user has more than two resources configured with the cross system authorization, a chain can be formed. As shown in FIG. 8B, there is an authorization chain: jack@sys1 to jack@sys2 and jack@sys2 to jack@sys3. So jack@sys3 could have the same privileges on sys1, just as what jack@sys2 has. Thereby, the "trust/authorization" can be transmissible. The route from jack@sys1 to jack@sys3 is indirect. Thus, jack@sys2 becomes a necessary node on the route of the authorization chain.

In another embodiment of the disclosure, the task network may be formed by using single sign on (SSO) technology. It is known that SSO technology results in multiple systems/resources that are connected through a single sign on. These SSO-connected systems/resources can form a task network for the user who uses the single sign on. Alternatively, the task network may be formed based on a domain control network or peer-to-peer (P2P) network. Specifically, a node of the domain control network or P2P network can communicate with others, by utilizing the mechanism or architecture of their network. Similarly, the non-directional task can be passed and transferred from one node to other nodes.

In an embodiment of the disclosure, the task network may be private and only work for an authenticated user or external systems. When the systems in the task network interact with other external systems or users, they may apply some existing security mechanisms to guarantee the security of a network connection and application. For example, SSL safety certificate, password validation, and so on can be employed.

In an embodiment of the disclosure, the task network is able to transmit a non-directional task, to support task responding or to complete the requirement of the non-directional task. The task network comprises all resources/systems available and accessible to the user. The resource nodes of the task network are equal, not divided into master or slave. The connection (e.g., 711 or 712) between any two nodes is non-directional. Once two nodes are connected, one node can send/receive task/information to/from the other node. Due to the non-directional connections, a node in the network has complete connectivity to all other nodes. In other words, a node is connectable to/from other nodes in the task network directly or indirectly.

Figure 11:
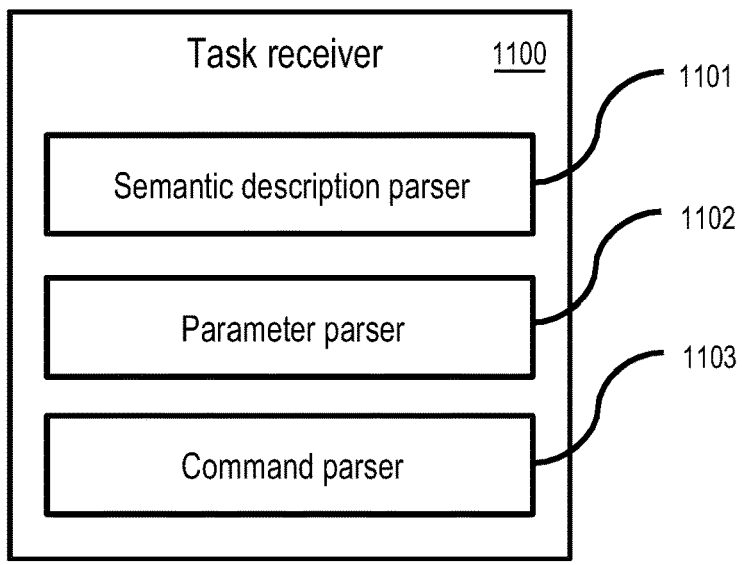
FIG. 11 shows the structure of a task receiver according to an embodiment of the present disclosure.

Returning to FIG. 4, at step 406, it is determined whether the first resource node can perform at least part of the non-directional task. For example, step 406 may be performed by a task receiver in the first resource node. FIG. 11 shows the structure of a task receiver according to an embodiment of the present disclosure. As shown in FIG. 11, the task receiver 1100 may comprise a semantic description parser 1101, a parameter parser 1102 and a command parser 1103.

The semantic description parser 1101 is configured to parse the semantic description about the user requirement stored in the semantic description component 601 of a task and figure out the special pattern, special purpose or some other pre-defined content associated to some certain programs.

For a text-based semantic requirement, it might comprise some words/characters, a phrase or a sentence of a natural language. The parser 1101 is configured to map the words/characters to a pre-defined pattern. Then, the parser 1101 may understand the semantic requirement and map it to a pre-defined program. For example, in the task of "start the water heater", the parser 1101 may understand that the word "start" is an acceptable operation and "the water heater" is an identified device name/type. Thus, the parser 1101 may be configured to invoke the program corresponding to the "water heater". Here, any existing or future technologies for natural language processing can be used for the parser 1101. For example, the parser may be implemented based on keyword mapping, text categorization, information extraction, automatic summarization, or any other natural language processing technologies, such as systems based on artificial intelligence, neural network, and machine learning.

For a speech-based semantic requirement, it might be a piece of voice. The parser 1101 can recognize the voice and convert it to readable text or binary data. Alternatively, the parser 1101 can pick out some specified/known patterns and voice characters. Then, the parser 1101 can map it to a pre-defined program and, thus, understands it. Here, any existing or future technologies for voice recognition and natural language processing can be used for the parser 1101, including, but not limited to, technologies of Dynamic Time Warping (DTW), Vector Quantization, Support vector machine, and other technologies based on artificial intelligence, neural network, and machine learning. For example, the user may speak to a microphone or other kinds of voice recording devices, saying a command "start the water heater". The voice can be recorded and saved as audio data in a non-directional task. Then, the task can be passed/transferred to the nodes of the user's task network. The parser 1101 of a resource may use the existing speech-to-text technologies to convert the user's voice command into a text command. Then, the text is further parsed and mapped to a pre-defined program, which can turn on the heater.

For an image or video based semantic requirement, it might be a piece of video or an image. The parser 1101 is configured to recognize the content/gesture/motion/purpose presented by the image/video and convert it to readable text or binary data. Alternatively, the parser 1101 is configured to pick out some specified/known patterns and gesture/motion characters. Then, the parser 1101 can map it to a pre-defined program and, thus, understands it. Here, any existing or future technologies for image or video recognition can be used for the parser 1101, including, but not limited to, face detection and alignment, Local Binary Patten, and other technologies based on artificial intelligence, neural network, and machine learning.

The parameter parser 1102 is configured to read the parameter component 602 of a non-directional task and map it to certain special patterns, special purpose or some other pre-defined content that are associated to certain programs. If successful, then the parameter parser 1102 understands the parameter component 602.

The command parser 1103 is configured to read the command component 603 of a non-directional task and map it to certain special patterns, special purpose or some other pre-defined content that are associated to certain programs. If successful, then the command parser 1103 understands the command component 603.

In this way, the task receiver 1100 can perform step 406 to determine whether it can understand the requirement component of the task. The term "understand" means that the receiver can successfully understand the user requirement in the non-directional task, for example, through parsing any of the semantic description component 601, parameter component 602 and command component 603 and associating to a program, or content available in the system.

Figure 9A:
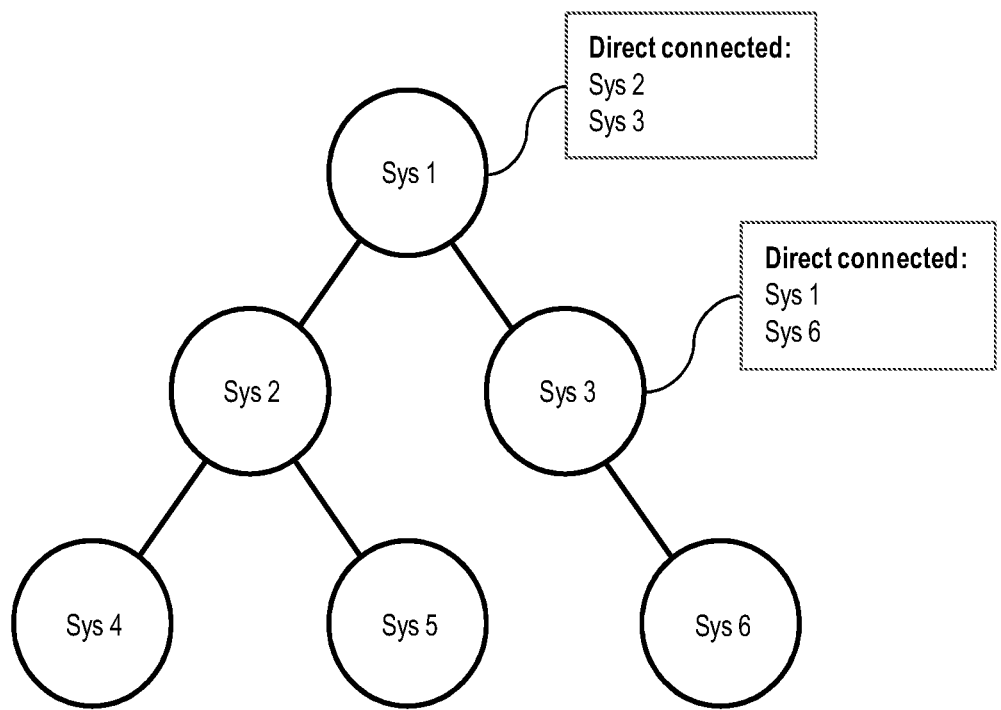
FIGS. 9A and 9B show two approaches for storing connection information for a task network according to some embodiments of the present disclosure.
Figure 9B:
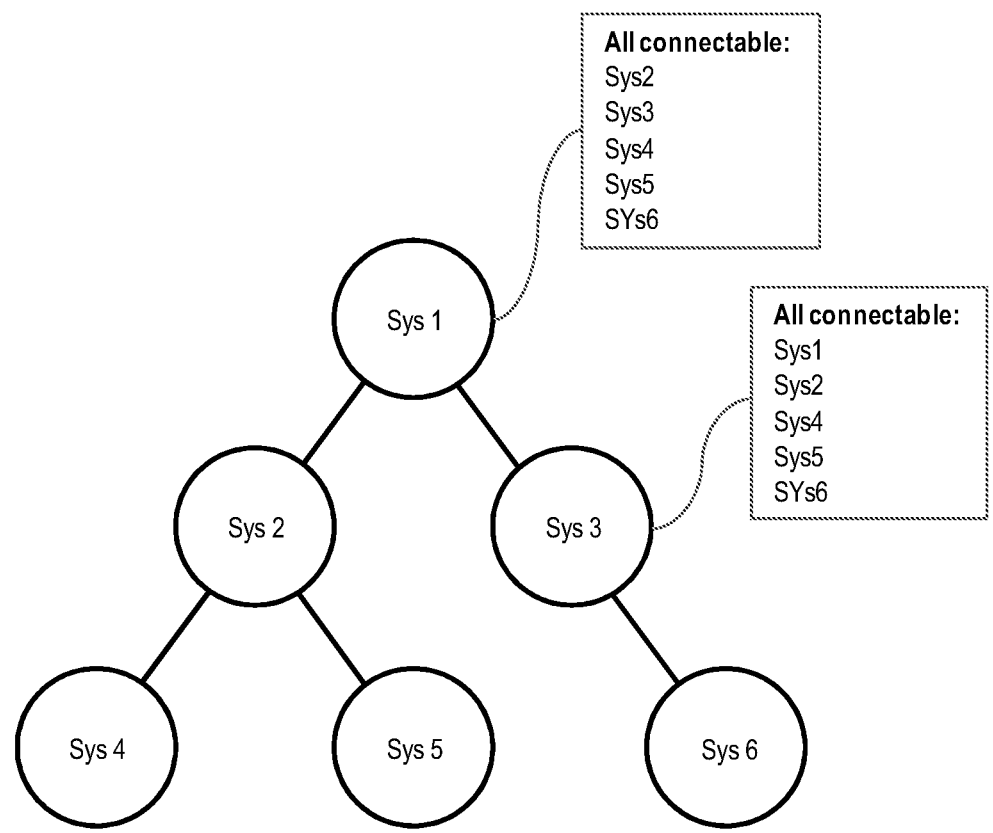

Returning to FIG. 4, at step 408, the non-directional task is forwarded from the first resource node to a second resource node of the task network. FIGS. 9A and 9B show two approaches for storing connection information for a task network according to some embodiments of the present disclosure. These two approaches may be utilized to store and fetch information of all nodes of a task network. Since the information presents the connections/relationships between the nodes, a task can be transmitted to others according to the connections and relationships, among the task network.

In the first approach of FIG. 9A, information about directly-connected nodes is stored. That is, a resource node stores information about the other nodes that it connects to directly. For example, the system Sys 1 stores information about Sys 2 and Sys 3, which Sys 1 connects to directly. The system Sys 3 stores information about Sys 1 and Sys 6, which Sys 3 connects to directly. According to the information, a task can be forwarded one node by one node and eventually passed through the whole task network.

In the second approach of FIG. 9B, a resource node stores information about all connectable nodes in the task network. For example, the system Sys 1 stores not only information about Sys 2 and Sys 3, which Sys 1 connects to directly; but also information about Sys 4, Sys 5 and Sys 6, which Sys 1 connects to indirectly via other nodes. Similarly, the system Sys 3 stores information about Sys 1, Sys 6, Sys 2, Sys 4 and Sys 5. According to the information, a node can forward a task to all connectable nodes. Once a connection is added/changed/removed in the task network, the changes may be transferred to all nodes. Thereby, a node can always have the updated and fresh connection information.

Figure 10A:
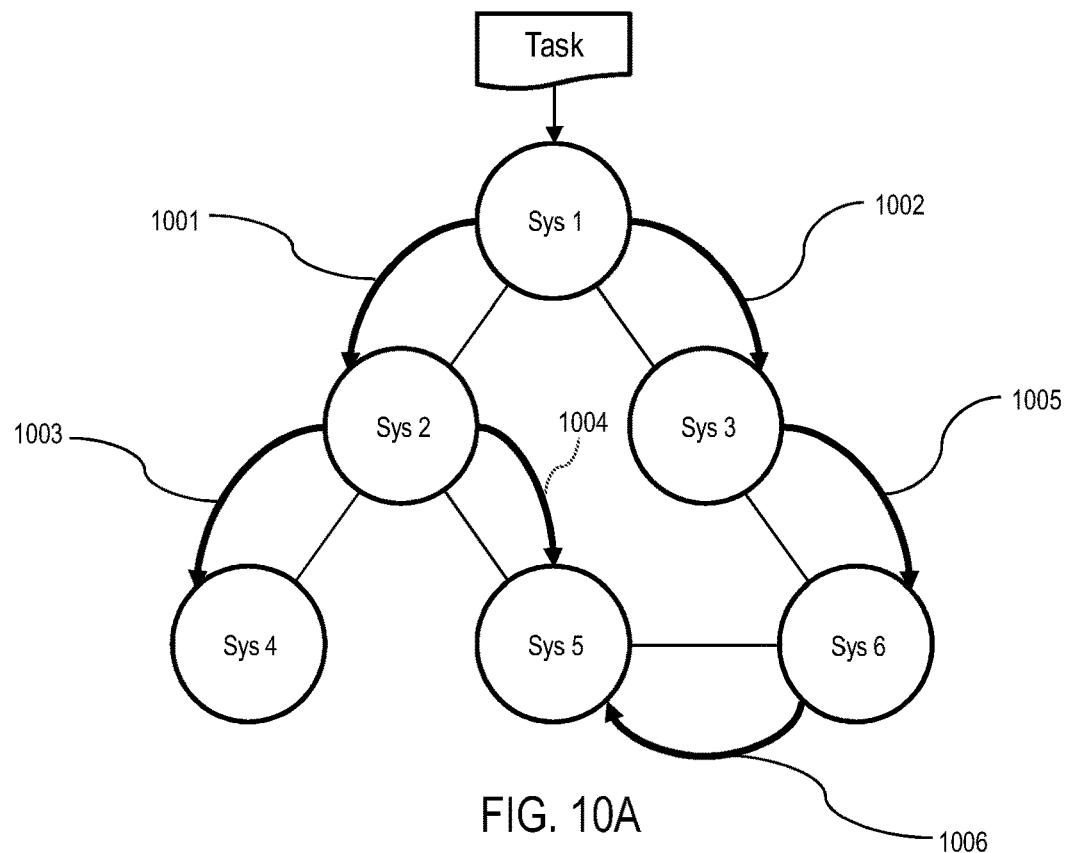
FIGS. 10A and 10B show two approaches for forwarding a non-directional task according to some embodiments of the present disclosure.
Figure 10B:
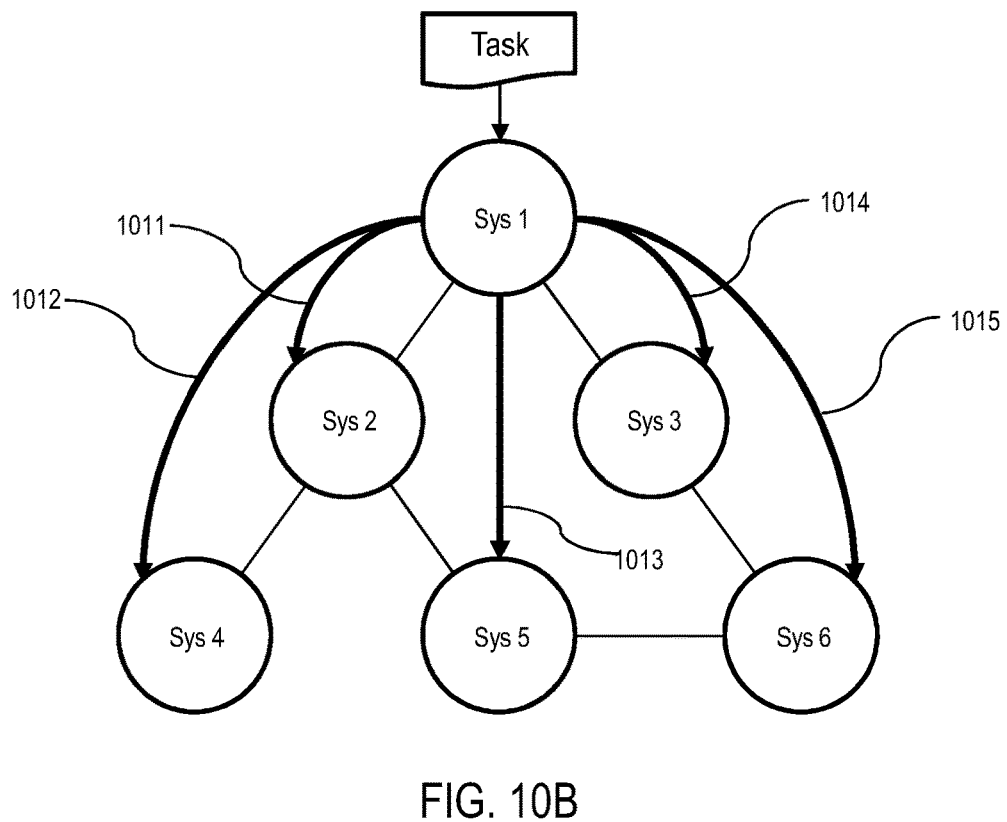

FIGS. 10A and 10B show two approaches for forwarding a non-directional task according to some embodiments of the present disclosure. These two approaches describe how to transmit task and other information from one node, to all other nodes among the task network. By these two approaches, once a task is created and received by a task network, each resource node of the task network can receive and try to respond to the task.

In the approach of FIG. 10A, a resource node transmits the non-directional task to its directly-connected nodes. For example, if a non-directional task is first received by the system Sys 1, then the task can be transmitted to all other nodes of the task network in the following manner:

1) Sys 1 transmits the task to Sys 2 (via path 1001) and Sys 3 (via path 1002), which are connected to Sys 1 directly.

2) Sys 2 transmits the task to Sys 4 (via path 1003) and Sys 5 (via path 1004), which are connected to Sys 2 directly.

3) Sys 3 transmits the task to Sys 6 (via path 1005), which is connected to Sys 3 directly.

4) Sys 6 transmits the task to Sys 5 (via path 1006), which is connected to Sys 6 directly.

In the above example, Sys 5 may receive the task twice. When realizing the two tasks are the same, Sys 5 can simply ignore the duplicated one. Sys 5 may receive the task earlier than Sys 6. Thus, the task may be transmitted from Sys 5 to Sys 6. This does not affect the result or efficiency of the task network.

In an embodiment of the disclosure, to prevent an endless forwarding loop, a non-directional task is assigned with a task ID, which is a global unique ID in the task network. A resource node transmits the same task to another same node only once. A node does not transmit back the same task to the node which has already sent the task to it before. For example, suppose that Sys 1 transmits a task with the task ID "T001" to Sys 3. When Sys 3 receives the task T001 from others rather than Sys 1, Sys 3 does not transmit the task T001 to Sys 1, since it knows that Sys 1 already has T001. In this way, an endless forwarding loop can be avoided.

In another embodiment of the disclosure, a resource node can add its name, address, or ID into the header of a non-directional task before transmitting it to others. Thereby, a transmission path will be recorded in the task. A resource node does not transmit the task to any other node existing in the path again. In the example of FIG. 10A, after passing through paths 1002, 1005 and 1006, a path Sys 1→Sys 3→Sys 6→Sys 5 can be recoded into the task. Then, Sys 5 will not transmit the task to Sys 1, Sys 3 and Sys 6.

The approach of FIG. 10B corresponds to the approach of FIG. 9B. In the approach of FIG. 10B, since a node has already known all other connectable nodes among the task network, the first node that receives the task can transmit the task to all other connectable nodes. For example, a task is received at the system Sys 1. The task can be transmitted to all other nodes of the task network in the following manner:

1) Sys 1 transmits the task to Sys 2 (via path 1011) and Sys 3 (via path 1014), which are connected to Sys 1 directly.

2) Sys 1 transmits the task to Sys 4 (via path 1012), Sys 5 (via path 1013) and Sys 6 (via path 1015), which are connected to Sys 1 indirectly.

Figure 12:
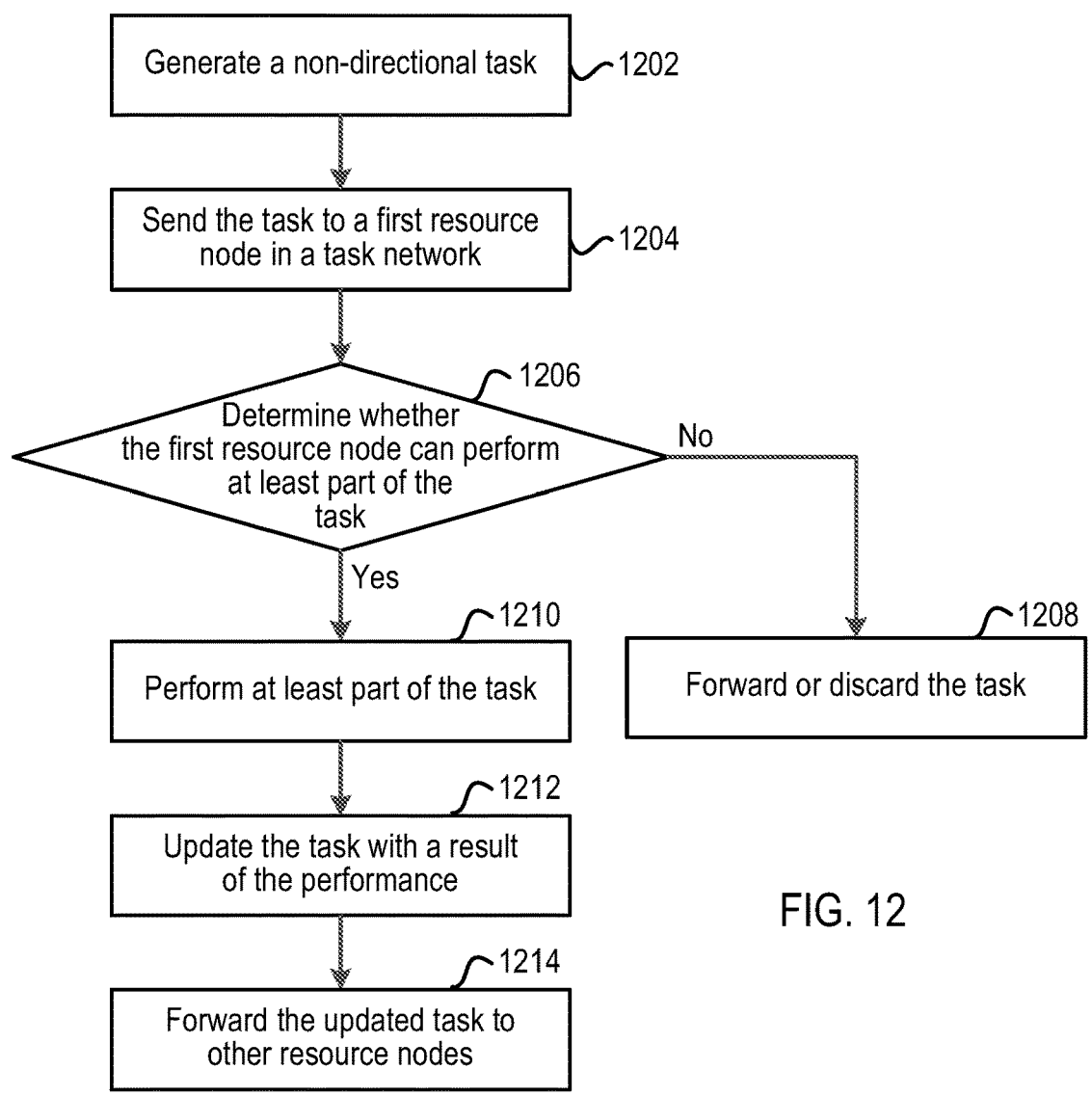
FIG. 12 is a flow chart showing a computer-implemented method for a non-directional task according to an embodiment of the present disclosure.

FIG. 12 is a flow chart showing a computer-implemented method for a non-directional task according to an embodiment of the present disclosure. As shown in FIG. 12, at step 1202, a non-directional task comprising a user's requirement is generated. This step may be similar to step 402 described above with reference to FIG. 4. The non-directional task does not specify which resource node to perform the non-directional task. Details of the non-directional task have been described in the above embodiments and are omitted here for brevity.

At step 1204, the non-directional task is sent to a first resource node in a task network. As described above, the task network comprises a plurality of resource nodes that provide services accessible to the user.

At step 1206, it is determined whether the first resource node can perform at least part of the non-directional task. This step may be performed by the task receiver 1100 described above. When it is determined at step 1206 that the first resource node cannot perform the task, the first resource node forwards or discards the task at step 1208.

As described above, the first resource node can determine whether to forward the task based on its stored information about other nodes and the forwarding path recorded in the task. When it is necessary to forward the task, the first resource node forwards the task to other resource nodes. When determining not to forward the task, the first resource node discards the task at step 1208.

On the other hand, when it is determined at step 1206 that the resource node can perform at least part of the non-directional task, the first resource node performs said at least part of the task at step 1210.

At step 1212, the first resource node updates the task with a result of the performance. For example, the first resource node may insert the execution result into the result component of the task. If the first resource node performs the whole task, the type information in the task header may be set as "execution result". If the first resource node performs only part of the task, the type information in the task header may be set as "semi-execution result".

At step 1214, the first resource node forwards the updated task to other resource nodes of the task network directly or indirectly. This step may be performed as described above with reference to FIGS. 9A-9B and FIGS. 10A-10B.

In another embodiment of the disclosure, after step 1204 is performed, another determination can be made as to whether the resource node should forward the non-directional task. When it is necessary to forward the task, the first resource node forwards the task to one or more other resource nodes. When it is determined not to forward the task, the process proceeds to step 1206 and follows similar steps as the above-described embodiment of FIG. 12. Thus, in this embodiment, a resource node may forward a task twice. At the first time, the original task is forwarded to other resource nodes of the task network. At the second time, the updated task is forwarded to other resource nodes.

Figure 13:
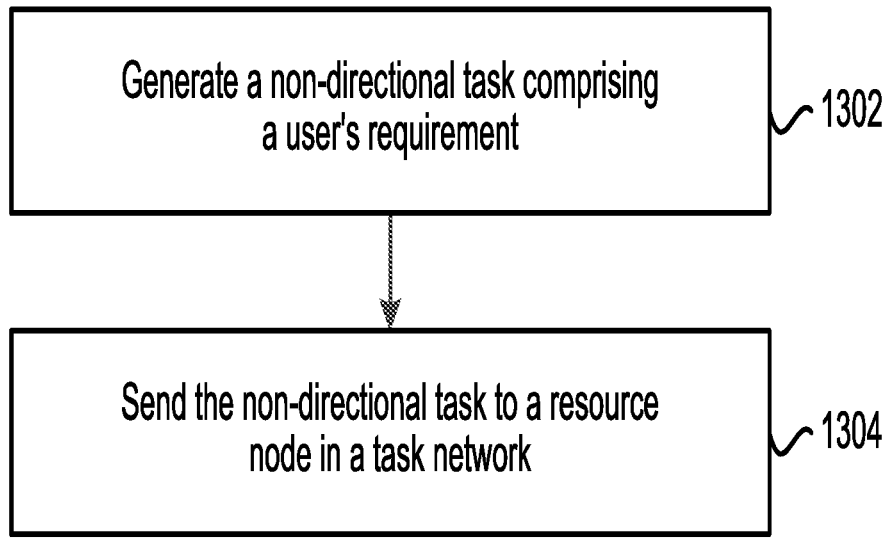
FIG. 13 is a flow chart showing the process for a non-directional task performed at a user device according to an embodiment of the present disclosure.

FIG. 13 is a flow chart showing the process for a non-directional task performed at a user device according to an embodiment of the present disclosure. As shown in FIG. 13, at step 1302, a non-directional task comprising a user's requirement is generated. This step may be similar to step 402 described above with reference to FIG. 4.

At step 1304, the non-directional task is sent to a resource node in a task network. As described above, the task network comprises a plurality of resource nodes that provide services accessible to the user. The non-directional task does not specify which resource node to perform the non-directional task. Details of the non-directional task have been described in the above embodiments and are omitted here for brevity.

It is noted that the user device can be any computing apparatus used by the user of the task network. Physically, the user device can be a separate device or part of the task network. The user device may generate the non-directional task as stand-alone and send the non-directional task to any one of them. The user may also directly log on one of the resource nodes to generate the non-directional task with a user interface provided by the resource node.

Figure 14:
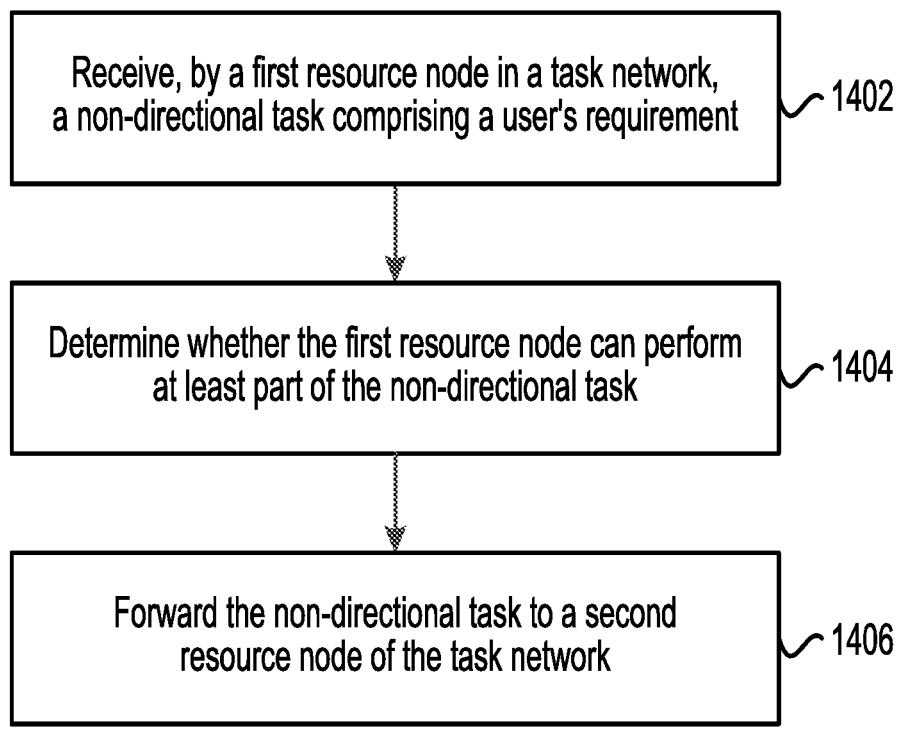
FIG. 14 is a flow chart showing the process for a non-directional task performed at a resource node according to an embodiment of the present disclosure.

FIG. 14 is a flow chart showing the process for a non-directional task performed at a resource node according to an embodiment of the present disclosure. As shown in FIG. 14, at step 1402, a non-directional task comprising a user's requirement is received by a first resource node in a task network. The task network comprises a plurality of resource nodes that provide services accessible to the user. The non-directional task does not specify which resource node to perform the non-directional task. Details of the non-directional task have been described in the above embodiments and are omitted here for brevity.

The first resource node may be a starting node that receives the task directly from the user device. It may also be a node that receives the task directly or indirectly from the starting node.

At step 1404, it is determined whether the first resource node can perform at least part of the non-directional task. Then, at step 1406, the non-directional task is forwarded to a second resource node of the task network. The steps 1404 and 1406 in this embodiment are similar to steps 406 and 408 in the above-described embodiments. Detailed description about them is omitted here for brevity.

The embodiment of FIG. 14 can also incorporate the steps shown in FIG. 12. Further, step 1406 may comprise forwarding the original task or the updated task to the remaining resource nodes directly or indirectly.

Figure 15A:
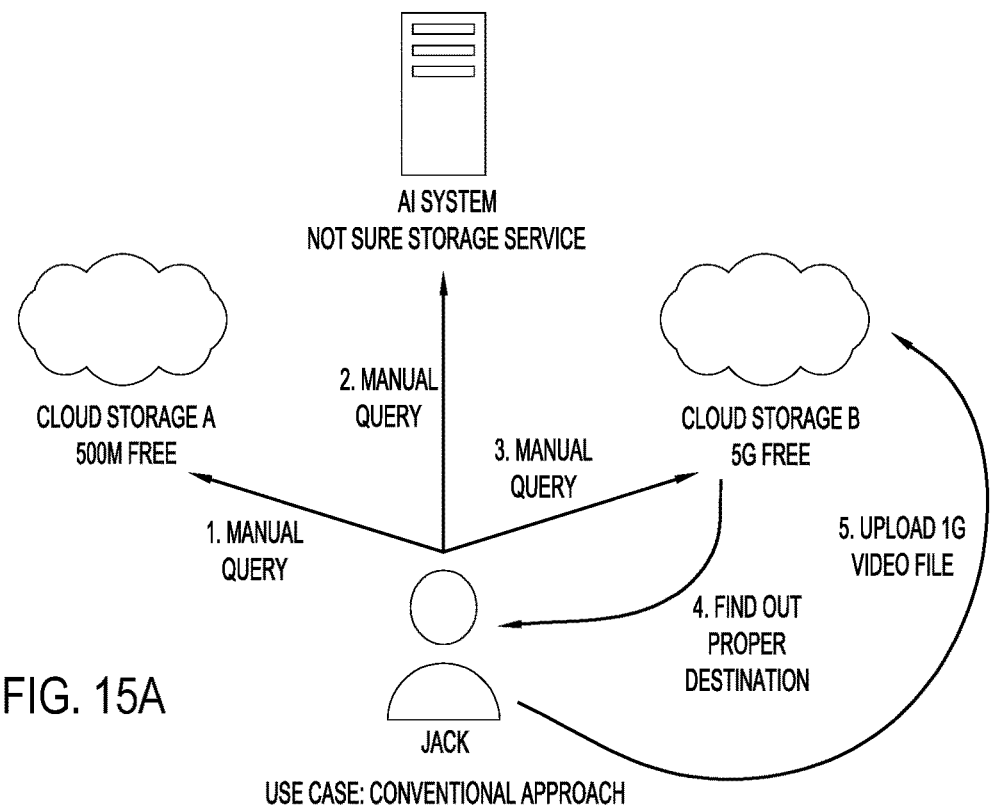
FIGS. 15A and 15B show a comparison between a conventional approach and a novel approach for an example use case.
Figure 15B:
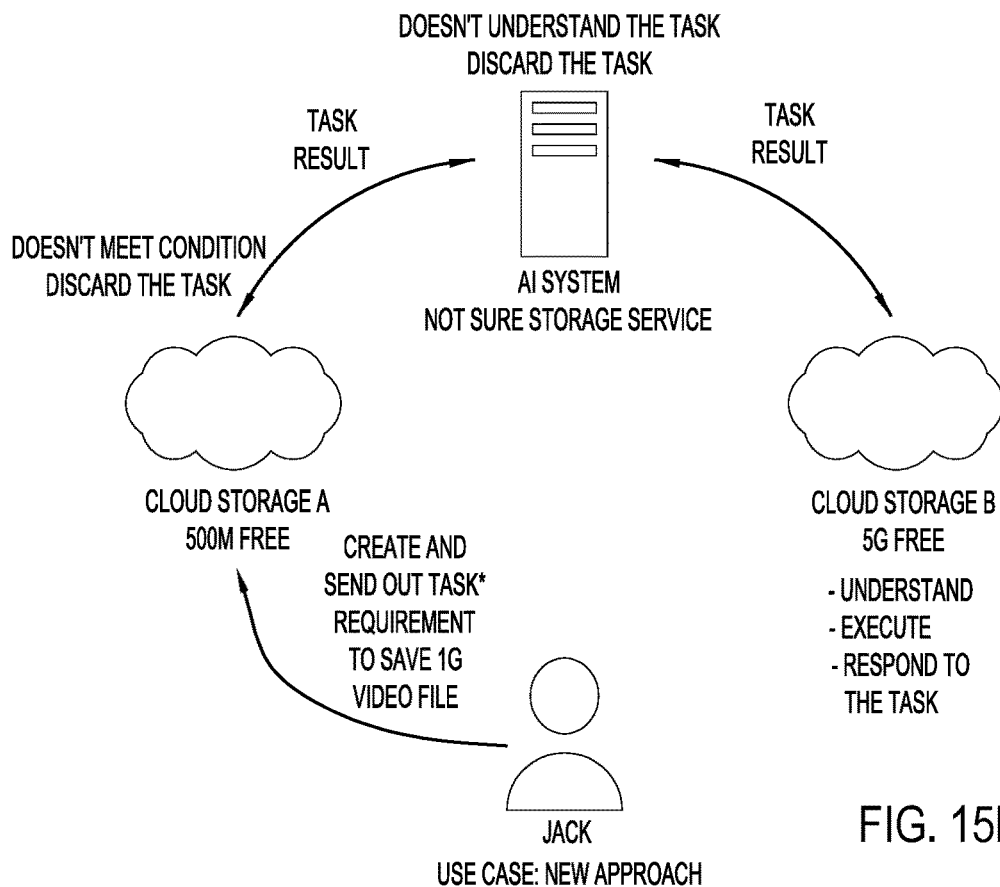

FIGS. 15A and 15B show a comparison between a conventional approach and a novel approach for an example use case. FIG. 15A shows the conventional approach, while FIG. 15B shows the novel approach. In this example, a user, Jack, has access to three resources. The first resource is cloud storage A, which has only 500 M free space. The second resource is an artificial intelligence (AI) system. It is not sure whether there is any storage service available on it. The third resource is cloud storage B, which has 5G free space and accepts video files. Jack wants to upload and save a video file with 1G size.

As shown in FIG. 15A, under the conventional approach, Jack needs to complete the following steps: 1) querying cloud storage A manually; 2) querying the AI system manually; 3) querying cloud storage B manually; 4) finding out that cloud storage B is the proper destination; and 5) uploading the 1G video file onto cloud storage B.

As shown in FIG. 15B, based on the novel approach, Jack only needs to complete one step: creating a non-directional and transmissible task that includes the requirement of uploading 1G video file. The task can be sent to any one of the systems that are accessible to Jack. In this example, the task is sent to cloud storage A.

The system "cloud storage A" will transmit this task to all other connectable systems that Jack has access to. Then, these connectable systems together with "cloud storage A" will try to understand the task. Once the task gets understood by a system, the system will perform the task by executing corresponding program(s).

In this use case, cloud storage A does not have enough capacity to perform the task and, thus, discards the task. The AI system does not provide storage service and cannot understand the task. Thus it discards the task. Cloud storage B understands the task and has necessary capacity. Therefore, cloud storage B finally executes the task. In this way, Jack does not need to specify any fixed system to store the 1G video file, and the proper system will complete the requirement.

Figure 16A:
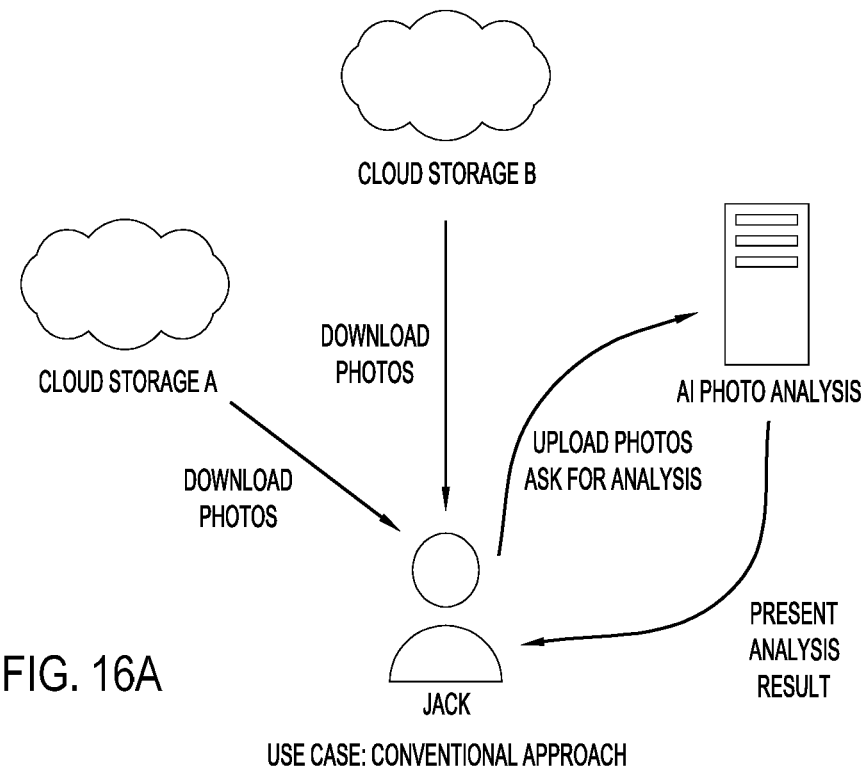
FIGS. 16A and 16B show a comparison between a conventional approach and a novel approach for another example use case.
Figure 16B:
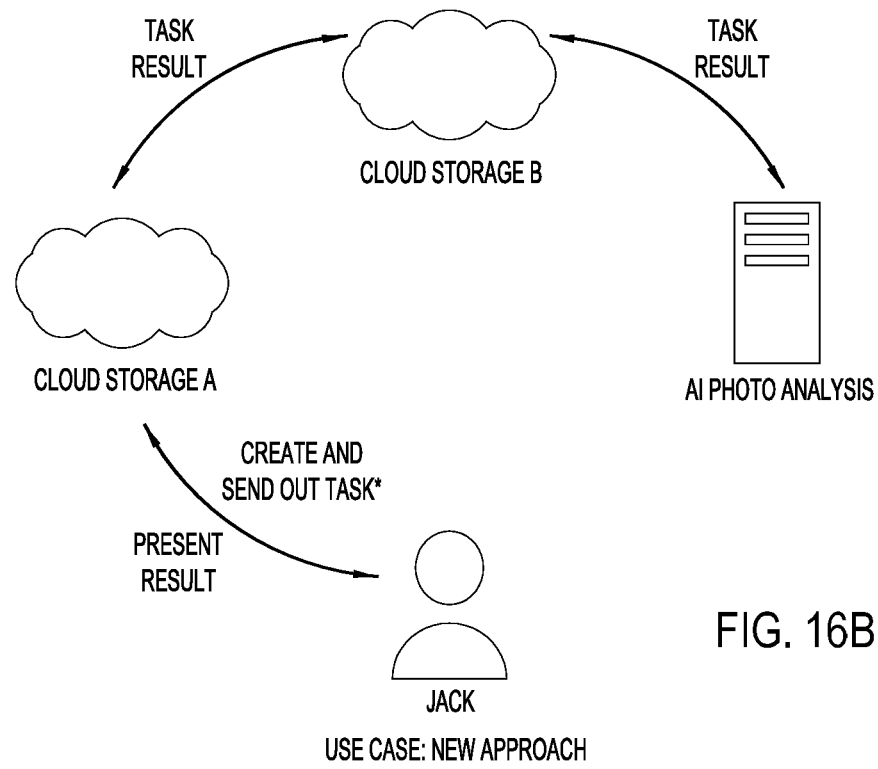

FIG. 16A shows a conventional approach for the second use case, while FIG. 16B shows a novel approach for that use case. In this example, the user, Jack, has multiple photos on several cloud storage systems. He also has access to an AI service. Jack wants to collect all photos taken in this year and analyze the facial changes.

As shown in FIG. 16A, under the conventional approach, Jack needs to complete the following steps: 1) downloading all photos from the cloud storage systems; 2) uploading the photos to the AI system; 3) asking for analysis of the AI service; and 4) getting the result.

As shown in FIG. 16B, based on the novel approach, Jack only needs to complete one step: creating a non-directional and transmissible task that includes the requirement of analyzing the facial changes from the photos. The task can be sent to any one of the systems that are accessible to Jack. In this example, the task is sent to cloud storage A. The task requirement may be presented by text-based sentence in English, for example the text "Do an analysis of my yearly facial changes".

The system "cloud storage A" will transmit this task to all other connectable systems that Jack has access to. These connectable systems together with cloud storage A will try to understand the task. Once the task gets understood by a system, the system will execute the corresponding program.

In the example, cloud storage A parses the requirement and understands the task. Cloud storage A retrieves all photos of the user it has and updates the non-directional task with the found photos. Then, it forwards the updated task to other systems accessible to Jack.

Similarly, when receiving the non-directional task, cloud storage B parses the requirement and understands the task. Cloud storage B retrieves all photos of the user it has and updates the task with the photos. Then, it forwards the updated task to other systems accessible to Jack.

Finally, the AI system receives the updated non-directional task from cloud storage A and B. The AI system parses the requirement and understands it. It performs analysis based on the photos from cloud storages A and B. The analysis report is inserted into the task by the AI system and returned to Jack directly or through other systems accessible to Jack. In this way, Jack does not need to specify any fixed destination sources or services. Instead, the proper sources and services will decide to perform the task by themselves.

As shown in FIGS. 15A-15B, a task network comprises the resources and services that are accessible to a user, such as Jack. In addition to storage and AI, the task network may also comprise, for example, an intelligent TV and a mail system. In this case, they simply discard the task, since they do not have any capability related to "analysis of facial changes".

As shown in the above examples and embodiments, all the resources belonging to a user will work as one resource, and the systems will work with a more intelligent method. Users can only focus on requirements and tasks, and do not need to take care of the systems' details or which systems will respond to the tasks.

Compared to a conventional API, Enterprise Service Bus, cluster computing, peer-to-peer networking, the above-described embodiments have certain advantages. For example, with a non-directional task, the user does not need to specify the destination of the task. This means that the user does not know or does not want to know which resource will respond and execute the task. The user only needs to send out the task once, and the task will be transmitted to all available resources of the user. The user does not care which resource will save the file, or return the wanted photos eventually. Due to the characteristics of "transmissible", the task will be broadcasted among all available connected resources of the user.

Figure 17:
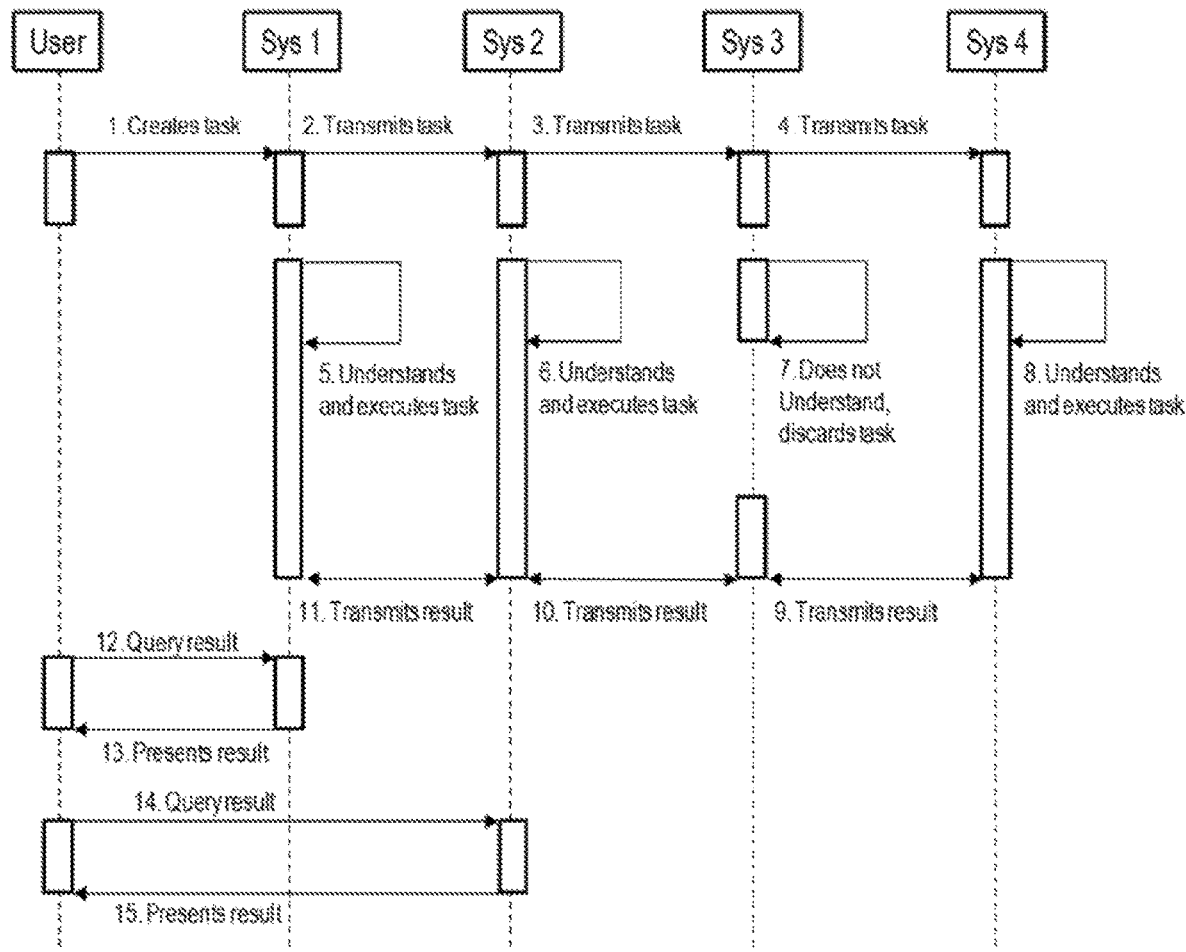
FIG. 17 is a flow chart showing an example process for a non-directional task.

FIG. 17 is a flow chart showing an example process for a non-directional task. It is assumed that there are four systems, Sys 1 to Sys 4, which a user has access to. The approach of FIG. 9A is utilized to store the node information. The approach of FIG. 10A is utilized to transmit tasks. For example, an authorization chain may be used to form the task network. In the task network, Sys 1 is directly connected to Sys 2; Sys 2 is directly connected to Sys 3; Sys 3 is directly connected to Sys 4. Of course, the approaches as shown in FIGS. 9B and 10B can also be used here without departing from the basic principles of this disclosure.

At step 1, the user logs on Sys 1 with a user interface, to create a non-directional task. It may comprise for example semantic description, parameter(s) or command(s), and some other necessary content, as described above.

At steps 2, 3 and 4, Sys 1, Sys 2 and Sys 3 transmit the non-directional task to their directly-connected nodes. Specifically, Sys 1 transmits the task to Sys 2; Sys 2 transmits the task to Sys 3; Sys 3 transmits the task to Sys 4.

At steps 5, 6 and 8, the task receivers on Sys 1, Sys 2 and Sys 4 try to parse the task. They understand the task and execute the corresponding programs. At step 7, the task receiver on Sys 3 tries to parse the task. But it does not understand the task and discards the task.

At steps 9, 10 and 11, the results of the task execution are inserted into the updated task and transmitted among the task network. Specifically, for the execution result of Sys 1, it is transmitted from Sys 1 to Sys 2, then from Sys 2 to Sys 3, and then, from Sys 3 to Sys 4. For the execution result of Sys 2, it is transmitted from Sys 2 to Sys 1 and Sys 3, and then, from Sys 3 to Sys 4. For the execution result of Sys 4, it is transmitted from Sys 4 to Sys 3, then from Sys 3 to Sys 2, and then, from Sys 2 to Sys 1.

It is noted that the updated task can be transferred or propagated in a similar manner as the original task. For example, either the approach of FIG. 10A or FIG. 10B can be used for the updated task. Moreover, there is no limitation for the order of resource notes that the updated task is passed or transferred through.

At steps 12 and 14, the user queries the task results from a resource node of the task network, for example, from Sys 1 or Sys 2. Since the task results have already been transmitted among the whole task network, Sys 1 and Sys 2 can present the results to the user at steps 13 and 15.

As another example, the task network may comprise smart appliances that are accessible to a user at his office or home. For example, the task network may comprise an intelligent TV, a water heater, a refrigerator, a mail system, a cloud storage system and an intelligent phone. Assume that the user may create a non-directional task with a voice semantic requirement "start the water heater". The speech might be in any language such as English, Chinese or French. The task may be first received by the intelligent TV and then forwarded to other nodes. The intelligent TV parses the voice and recognizes the semantic text. But it discards this task since it knows that it is not a heater. The mail system has no voice recognition module and discards the task. The water heater recognizes the voice and converts it to a binary/readable content, such as "start the water heater". It tries to take this as a command. Thereby it maps "start" to a general operation and maps "water heater" as a resource type/name. All of these can be mapped to a built-in program/instruction. Then, it starts the pre-defined hardware/software program to heat the water. The intelligent phone recognizes the voice and searches out some web pages by the search engine. The cloud storage system recognizes the voice. But it does not support this kind of task and discards the task.

As still another use case, a non-directional task may comprise a plain text command, such as "Install the security plug-in with the name ABC2017001". The non-directional task may also include some URLs of the security plug-in. The URLs point to the installation files corresponding to different platforms and devices. This is especially useful for a task network that has a large number of recourse nodes, for example, more than 50 devices/systems accessible to the user. When these devices/systems need to be enhanced with the security plug-in, the user can simply create a non-directional task. Then, the task can be transmitted to all the devices/systems, who automatically parse and perform the task.

For example, the intelligent TV parses the semantic text and understands the task. Then it begins to install the plug-in and gets success. The mail system parses the requirement. But it depends on the whole mail server. It finds that the security plug-in has already been available. So the task is discarded. The water heater cannot accept the text-based task and cannot understand the task. So it discards the task. The intelligent phone parses the requirement and understands it. Then it begins trying to install the plug-in and gets success. The cloud storage system parses the requirement and understands it. But its security policy does not allow an external installation. So the task will be ignored. Another internal alert will be reported to the administrator.

According to aspects of this disclosure, there have been provided system, method, and a computer program product for task generation and performance in a network environment. The computer program product may include a computer readable storage medium (or media) having computer readable program instructions thereon for causing a processor to carry out aspects of the present invention.

According to an embodiment of the present invention, there is provided a computer-implemented method. In the method, a non-directional task comprising a user's requirement is generated. The non-directional task is sent to a first resource node in a task network. The task network comprises a plurality of resource nodes that provide services accessible to the user. The non-directional task does not specify which resource node to perform the non-directional task. It is determined whether the first resource node can perform at least part of the non-directional task. The non-directional task is forwarded from the first resource node to a second resource node of the task network.

Optionally, the non-directional task comprises a global identification (ID) or identifier that identifies the non-directional task.

Optionally, the non-directional task comprises semantic information about the user's requirement.

Optionally, the semantic information about the user's requirement comprises any one or combination of a text based on natural language; an audio based on speech; and a video based on gesture or action.

Optionally, the non-directional task comprises any one or combination of parameter information about the user's requirement; command information about the user's requirement; and content information about a content to be processed by the non-directional task.

Optionally, the method further comprises performing at least part of the non-directional task when it is determined that the first resource node can perform at least part of the non-directional task.

Optionally, the method further comprises returning a result of the non-directional task to the user device.

Optionally, the method further comprises constructing the task network.

Optionally, the step of constructing comprises constructing the task network based on any one or combination of a manual operation of the user; an authorization chain formed among at least two resource nodes; single sign on (SSO); domain control network; and peer to peer (P2P).

Optionally, the non-directional task is forwarded from the first resource node to every other resource node of the task network directly or indirectly.

Optionally, the non-directional task is forwarded to a resource node only once.

Optionally, the method further comprises performing part of the task when it is determined that the first resource node can perform only part of the task. The method further comprises updating the task with a result of the performance. The step of forwarding comprises forwarding the updated task to other resource nodes of the task network directly or indirectly.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   one or more processors;
   a memory coupled to at least one of the processors;
   a set of computer program instructions stored in the memory and executed by at least one of the processors in order to perform actions of:
     receiving, at a first resource node in a task network, a non-directional task comprising a user's requirement including a natural language description of the non-directional task, wherein the task network comprises a plurality of resource nodes that provide services accessible to the user, the non-directional task does not specify which resource node to perform the non-directional task;
     applying natural language processing to the user's requirement at the first resource node to map the user's requirement to a program of the first resource node performing at least part of the non-directional task, wherein before applying the natural language processing, the first resource node forwards the non-directional task to multiple connectable resource nodes in the task network;
     performing at least part of the non-directional task at the first resource node via the mapped program, wherein at least one resource node from the multiple connectable resource nodes receiving the non-directional task is unable to perform the non-directional task;
     updating the non-directional task with a result of the mapped program of the first resource node performing at least part of the non-directional task; and
     forwarding the updated non-directional task to the multiple connectable resource nodes in the task network, wherein the at least one resource node from the multiple connectable resource nodes that previously was not able to perform the received non-directional task is able to perform one or more portions of the updated non-directional task when such resource node receives the updated non-directional task.

2. The system according to claim 1, wherein the set of computer program instructions are executed by at least one of the processors in order to further perform an action of:
   determining that the first resource node can perform at least part of the non-directional task.

3. The system according to claim 1, wherein the set of computer program instructions are executed by at least one of the processors in order to further perform an action of:
   returning a result of the non-directional task to the user.

4. The system according to claim 1, wherein each of the multiple connectable resource nodes is connected to the first resource node directly or indirectly.

5. The system according to claim 1, wherein the non-directional task comprises a global identification (ID) that identifies the non-directional task.

6. The system according to claim 1, wherein the set of computer program instructions are executed by at least one of the processors in order to further perform actions of:
   generating the non-directional task comprising the user's requirement; and
   sending the non-directional task to the first resource node in the task network.

7. The system according to claim 6, wherein the set of computer program instructions are executed by at least one of the processors in order to further perform an action of:
   receiving a result of the non-directional task from at least one of the resource nodes in the task network.

8. The system according to claim 6, wherein the non-directional task comprises any one or combination of:
   semantic information about the user's requirement;
   parameter information about the user's requirement;
   command information about the user's requirement; and
   content information about a content to be processed by the non-directional task.

9. The system according to claim 1, wherein a user account having access privileges on the first resource node is associated with user accounts on any other resource nodes in the task network, and the set of computer program instructions are executed by at least one of the processors in order to further perform an action of:
   providing the any other resource nodes with the same access privileges of the user account on the first resource node in response to obtaining access to the first resource node via an associated user account.

10. A computer program product, comprising a computer readable storage medium having program instructions embodied therewith, the program instructions executable by one or more processors to cause the one or more processors to:

receive, at a first resource node in a task network, a non-directional task comprising a user's requirement including a natural language description of the non-directional task, wherein the task network comprises a plurality of resource nodes that provide services accessible to the user, the non-directional task does not specify which resource node to perform the non-directional task;

apply natural language processing to the user's requirement at the first resource node to map the user's requirement to a program of the first resource node performing at least part of the non-directional task, wherein before applying the natural language processing, the first resource node forwards the non-directional task to multiple connectable resource nodes in the task network;

perform at least part of the non-directional task at the first resource node via the mapped program, wherein at least one resource node from the multiple connectable resource nodes receiving the non-directional task is unable to perform the non-directional task;

update the non-directional task with a result of the mapped program of the first resource node performing at least part of the non-directional task; and forward the updated non-directional task to the multiple connectable resource nodes in the task network, wherein the at least one resource, node from the multiple connectable resource nodes that previously was not able to perform the received non-directional task is able to perform one or more portions of the updated non-directional task when such resource node receives the updated non-directional task.

11. The computer program product according to claim 10, wherein the program instructions are executable by the one or more processors to further cause the one or more processors to:

generate the non-directional task comprising the user's requirement; and send the non-directional task to the first resource node in the task network.

12. The computer program product according to claim 11, wherein the program instructions are executable by the one or more processors to further cause the one or more processors to:

receive a result of the non-directional task from at least one of the resource nodes in the task network.

13. The computer program product according to claim 10, wherein the program instructions are executable by the one or more processors to further cause the one or more processors to:

determine that the first resource node can perform at least part of the non-directional task.

14. The computer program product according to claim 10, wherein the program instructions are executable by the one or more processors to further cause the one or more processors to:

return a result of the non-directional task to the user.

15. The computer program product according to claim 10, wherein each of the multiple connectable resource nodes is connected to the first resource node directly or indirectly.

16. The computer program product according to claim 10, wherein the non-directional task comprises a global identification (ID) that identifies the non-directional task.

17. The computer program product according to claim 11, wherein the non-directional task comprises any one or combination of:

semantic information about the user's requirement;
parameter information about the user's requirement;
command information about the user's requirement; and
content information about a content to be processed by the non-directional task.

18. The computer program product according to claim 10, wherein a user account having access privileges on the first resource node is associated with user accounts on any other resource nodes in the task network, and the program instructions are executable by the one or more processors to further cause the one or more processors to:

provide the any other resource nodes with the same access privileges of the user account on the first resource node in response to obtaining access to the first resource node via an associated user account.

* * * * *